United States Patent
Loftus et al.

(10) Patent No.: US 9,448,083 B2
(45) Date of Patent: Sep. 20, 2016

(54) METHOD AND APPARATUS FOR PROVIDING A NAVIGATION ROUTE WITH RECOMMENDED CHARGING

(71) Applicant: Ford Global Technologies, LLC, Dearborn, MI (US)

(72) Inventors: Michael Edward Loftus, Northville, MI (US); Yimin Liu, Ann Arbor, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 14/188,786

(22) Filed: Feb. 25, 2014

(65) Prior Publication Data
US 2015/0241233 A1    Aug. 27, 2015

(51) Int. Cl.
*G01C 21/34* (2006.01)
*G01C 21/36* (2006.01)

(52) U.S. Cl.
CPC ....... *G01C 21/3469* (2013.01); *G01C 21/3682* (2013.01)

(58) Field of Classification Search
CPC ............ B60L 11/1838; B60L 11/1861; B60L 11/1824; B60L 8/03; B60L 11/1844; B60L 3/0046; G01C 21/3476; G01C 21/3469; H02J 7/0013; H02J 3/32; H02J 7/0029; B60J 11/04; G06Q 50/30
USPC .................. 701/36, 400, 410; 320/109, 134; 296/210; 307/9.1; 700/291; 340/995.13
See application file for complete search history.

(56) References Cited

U.S. PATENT DOCUMENTS

| | | | |
|---|---|---|---|
| 5,806,018 A | 9/1998 | Smith et al. | |
| 6,456,042 B1* | 9/2002 | Kwok | H02J 7/0029 320/128 |
| 8,851,560 B1* | 10/2014 | Freeman | B60J 11/04 180/2.2 |
| 2006/0149461 A1 | 7/2006 | Rowley et al. | |
| 2009/0082957 A1 | 3/2009 | Agassi et al. | |
| 2009/0312903 A1* | 12/2009 | Hafner | B60L 8/003 701/36 |
| 2011/0025267 A1 | 2/2011 | Kamen et al. | |
| 2011/0227532 A1* | 9/2011 | Niwa | B60L 11/1838 320/109 |
| 2012/0200256 A1* | 8/2012 | Tse | H02J 7/0013 320/109 |
| 2013/0222158 A1* | 8/2013 | Dai | G06Q 50/30 340/995.13 |
| 2013/0257145 A1* | 10/2013 | Caldeira | B60L 3/0046 307/9.1 |
| 2013/0261953 A1* | 10/2013 | Kiyama | G01C 21/3476 701/400 |
| 2014/0172183 A1* | 6/2014 | Beeman | H02J 3/32 700/291 |

* cited by examiner

Primary Examiner — Tuan C. To
Assistant Examiner — Yuri Kan
(74) *Attorney, Agent, or Firm* — Jennifer Stec; Brooks Kushman P.C.

(57) ABSTRACT

A system includes a processor configured to discover charging station locations within a predefined proximity to a route for which vehicle-charging is required to complete. The processor is also configured to determine a charging cost at each discovered station, including at least battery-damage resulting from a charge. The processor is further configured to present a plurality of charging stations, including the charging costs and an estimated total route time for each station. Also, the processor is configured to receive a station selection and present a route including a stop at the selected station.

20 Claims, 5 Drawing Sheets

METHOD AND APPARATUS FOR PROVIDING A NAVIGATION ROUTE WITH RECOMMENDED CHARGING

TECHNICAL FIELD

The illustrative embodiments generally relate to a method and apparatus for providing a navigation route with recommended charging.

BACKGROUND

Battery electric vehicle (BEV) owners and drivers are often faced with planning routes that exceed the range of energy stored in a traction battery at a given time, whether or not the battery has a full charge. Route planning for these owners is important, because if the vehicle runs out of charge, the owner cannot simply carry back a "can of charge," as could be done with a gasoline powered vehicle. Charging stations typically come in two forms, alternating current (AC) long charge stations, and direct current (DC) fast charge stations. While the fast charge stations offer the benefit of reduced charging time, they typically cost more money and they have a tendency to degrade the overall life of a vehicle battery. Vehicle batteries can be incredibly expensive to replace, so vehicle owners are advised to only use DC fast charging on occasion, to avoid expensive vehicle maintenance.

U.S. Application 2009/0082957 generally relates to an electric vehicle that includes an electric motor that drives one or more wheels of the vehicle and is powered by a battery. The electric vehicle determines a status of a battery of the vehicle and a geographic location of the vehicle. The electric vehicle then identifies at least one battery service station that the vehicle can reach based on the charge status of the battery of the vehicle and the geographic location of the vehicle. The electric vehicle displays the at least one battery service station to a user of the vehicle.

SUMMARY

In a first illustrative embodiment, a system includes a processor configured to discover charging station locations within a predefined proximity to a route for which vehicle-charging is required to complete. The processor is also configured to determine a charging cost at each discovered station, including at least battery-damage resulting from a charge. The processor is further configured to present a plurality of charging stations, including the charging costs and an estimated total route time for each station. Also, the processor is configured to receive a station selection and present a route including a stop at the selected station.

In a second illustrative embodiment, a computer-implemented method includes discovering charging station locations within a predefined proximity to a route for which vehicle-charging is required to complete. The method also includes determining a charging cost at each discovered station, including at least battery-damage resulting from a charge. The method further includes presenting a plurality of charging stations, including the charging costs and an estimated total route time for each station. Also, the method includes receiving a station selection and presenting a route including a stop at the selected station.

In a third illustrative embodiment, a non-transitory computer-readable storage medium stores instructions that, when executed by a processor, cause the processor to perform a method including discovering charging station locations within a predefined proximity to a route for which vehicle-charging is required to complete. The method also includes determining a charging cost at each discovered station, including at least battery-damage resulting from a charge. The method further includes presenting a plurality of charging stations, including the charging costs and an estimated total route time for each station. Also, the method includes receiving a station selection and presenting a route including a stop at the selected station.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
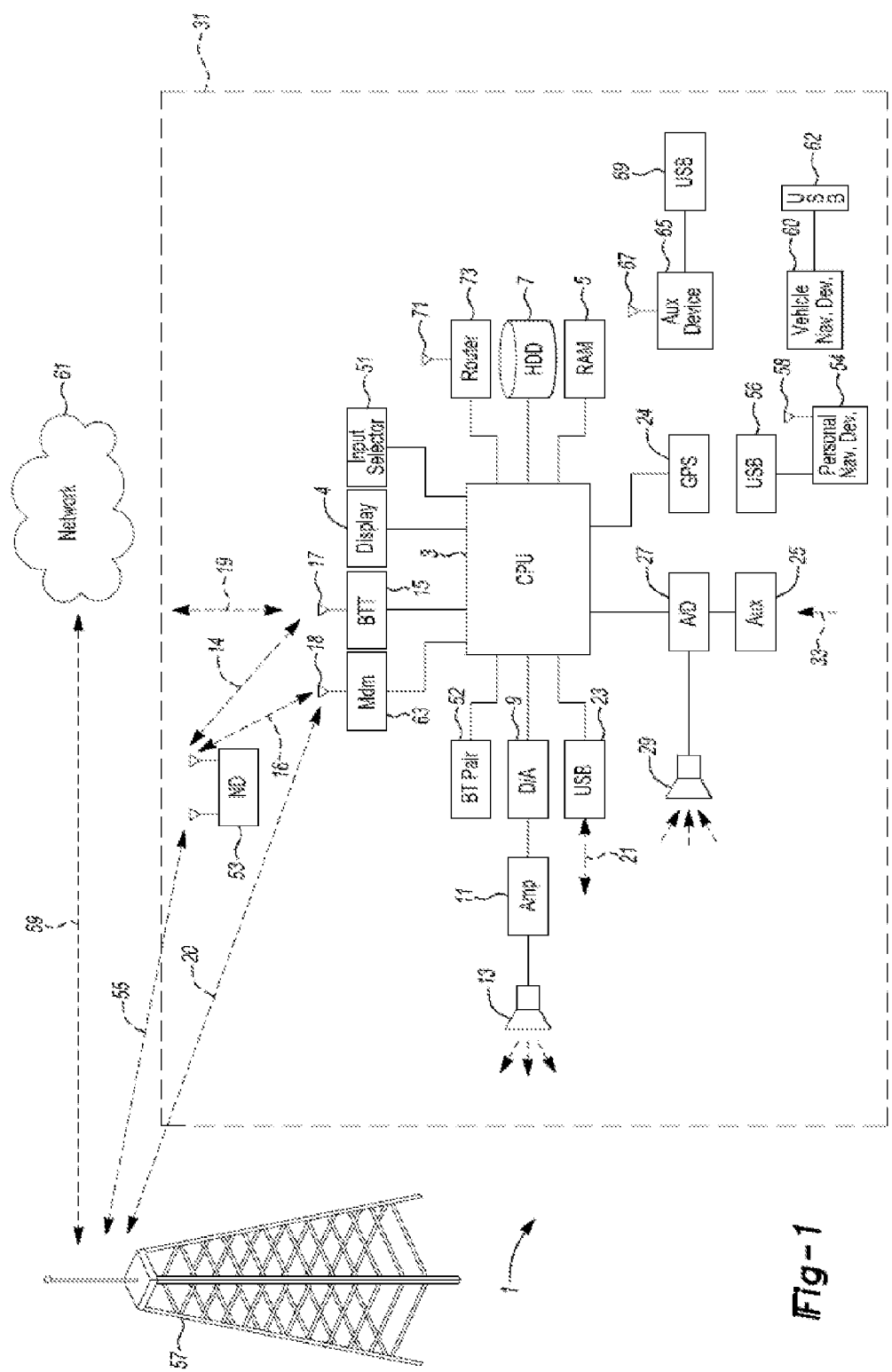
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (Firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

As previously noted, fast charging can be damaging to a vehicle battery. Accordingly, in the illustrative embodiments, the charging route algorithm takes into consideration the value differences between AC charging stations and DC fast charging stations. Further, DC charging stations can typically only deliver up to eighty percent full charge, so if more charge is needed, AC charging may be recommended.

Figure 2A:
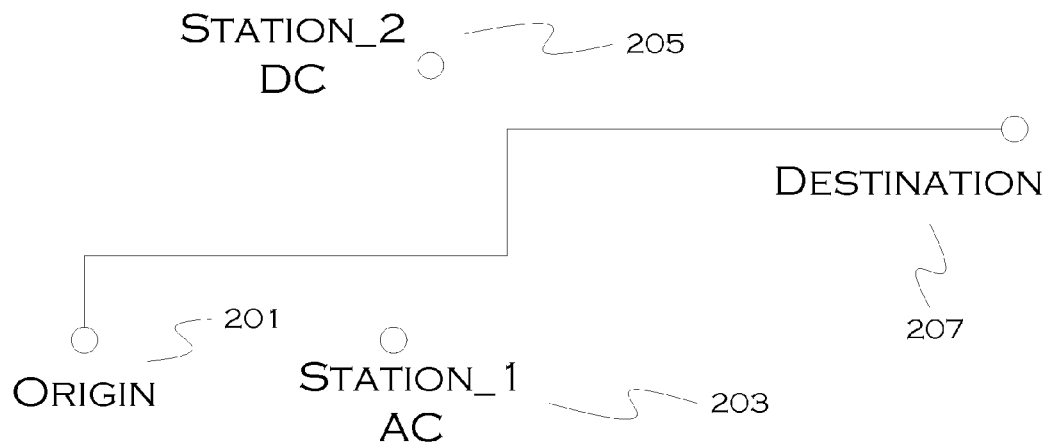
FIGS. 2A and 2B show illustrative examples of routes including charging stations.
Figure 2B:
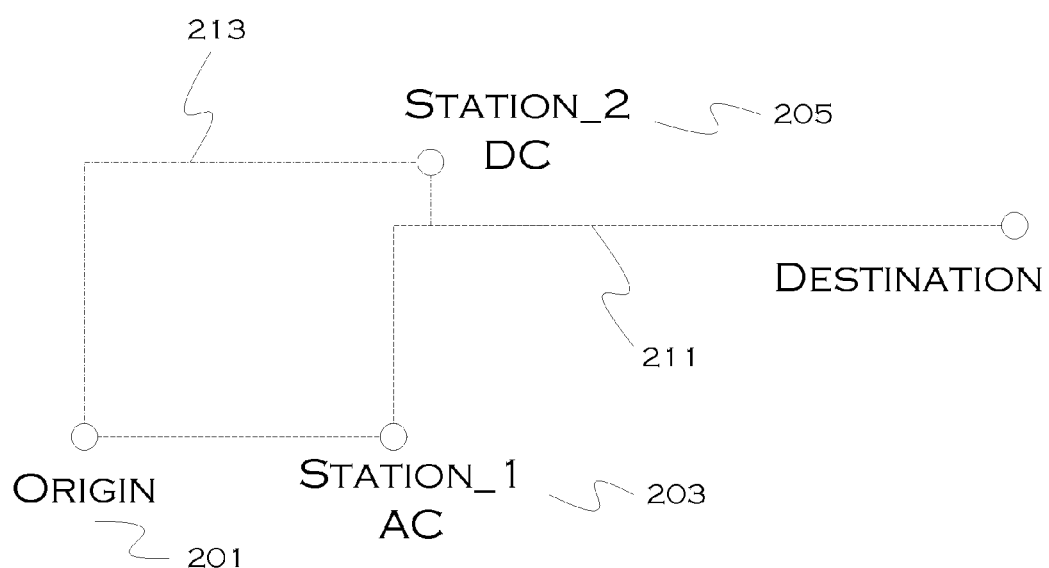

FIGS. 2A and 2B show illustrative examples of routes including charging stations. In this example, the system has solved for optimal charging routes considering charging stations as waypoints. These solutions are then subjected to any weighting rules to determine, for example, a route optimized for cost or time.

A number of routes may reach from the origin 201 to the destination 207 which have identical travel time. One example of such a route is shown by the solid line in FIG. 2A. In this example, all possible routes are too long to reach the destination on a single charge, so the routing system will calculate a stop at one of the charging stations between the origin and the destination. In this example, there are two stations, station 1, which is an AC charging station 203 and station 2, which is a DC charging station 205.

In this example, the routing algorithm solves for all routes of the same distance, and selects a route which, in this case, passes next to the AC station 203. This route is shown as route 211. If DC charging were desired, route 213 might be selected; although in this example that route is longer than the route 211. But, since DC charging is faster, the route 213 might be faster overall. On the other hand, the AC route 211 might be longer but may cost less or be better for battery life, so that route may be selected.

The process may need to discover stations within a predefined proximity of a route, when it is determined that charging is needed. Charging stations are not as prevalent as fuel stations, and the proximity may need to be rather large. Further, the process may expand the proximity until at least two stations, or at least one station of each type is discovered. A maximum expansion may also be applied, so that if the closest DC charging station is, for example, 50 miles in the wrong direction, this is not presented as an option.

MIT has recently developed algorithms for discovering an optimal route when total route time is considered to be a stochastic variable. Other stochastic variables can be battery-damage, energy cost of a route, etc. One such algorithm that was developed on a FORD-MIT Alliance project for energy efficient routing is called Robust Routing. Other suitable methods of route finding may also be used.

The illustrative embodiments can be used for any set of problems where there are multiple acceptable routes on the basis of travel time and energy consumption. Energy consumption may be calculated using physics-based black-box models with learned parameters. Data such as, but not limited to, prediction of temperature and other battery charge affecting factors can be considered along the route.

Figure 3:
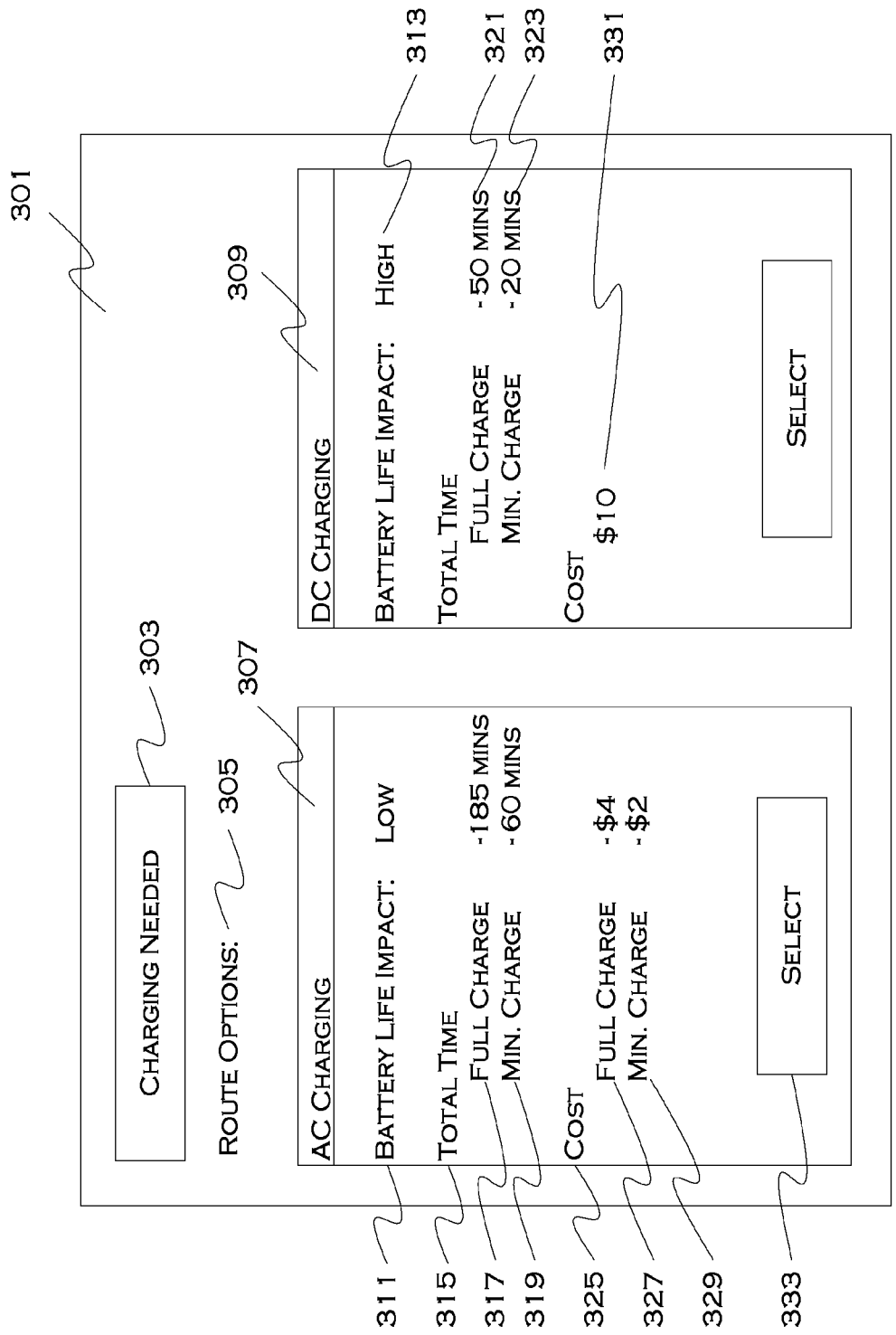
FIG. 3 shows an illustrative example of a vehicle interface.

FIG. 3 shows an illustrative example of a vehicle interface that demonstrates route presentation. This illustrative interface 301 could be presented as an in-vehicle display, for example. After a user has input a destination, the routing process could determine whether a vehicle can make the trip (one way, or round trip) on a present charge. This can be determined by any known suitable algorithm. If the vehicle can make the trip on a single, current charge, the process may simply present a route, or may present a map and an option to find a different route with charging (in case the user has extra time and wants to charge the vehicle).

If charging is needed, on the other hand, the process may present the interface 301 shown in FIG. 3. A notification that charging is needed may be presented 303. This could also state, for example, charging optional, charging not needed, etc. In another example, this could show a projected remaining charge for a route over which charging is not needed, or show the likelihood of reaching a destination In this example, the interface shows options for both AC and DC charging. This results from both stations being within a reasonable distance and/or along a planned route. In another example, the user could have the process only show AC charging, reserving DC charging for situations when time was critical (it could be available upon request). Or, in another example, the process could present DC options when the system determined that DC charging had not been too frequently used. Here, both route options 305 are shown for the user's review and selection.

In the AC charging option 307, the process shows the impact on the battery life 311, which, in this case is low. Although DC charging has a higher impact on the battery life, manufacturers agree that limited DC charging is acceptable. For this reason, the DC charging option 309 may also show a "low" impact on battery life 313 until the DC charging process is used too frequently. Then the impact state may change to "high" until a suitable time has passed.

DC charging and AC charging have different effects on battery health. Either one may have a deleterious effect on battery life. There may be an optimal balance of DC and AC charging. Because a battery naturally decays from other factors as well, a battery may only have a certain average life associated therewith. Accordingly, it may be acceptable to use DC charging a certain number of times over the life of the battery. It isn't that DC charging necessarily has a lesser effect on a battery when only used a limited number of times, but since the battery naturally decays anyhow, limited DC charging may not have an appreciable effect and thus the impact may be classified as "low."

The AC and DC routes may also show the estimated time to charge the battery 315. In this example, the process shows the time for a full charge 317 and a minimum charge 319. The minimum charge may be the limited amount of charge needed to complete the route. In this example, AC charging to a full charge takes 185 minutes and the limited amount of charge takes 60 minutes to complete 319 Similarly, the full DC charge takes 30 minutes to complete 321, and the minimum DC charge takes 10 minutes to complete 323. Other exemplary display items include estimated time of arrival. The minimum charge may be based on a user-defined threshold (e.g., how close to "empty" the user is willing to go).

As can be seen, the time factor of DC charging vs. AC charging may be significant. This time may also include travel time from the route, and since DC charging takes far less time, the driver may be willing to driver further/longer to obtain faster DC charging. Conversely, AC charging may be cheaper than DC charging. The cost portion of the display 325 shows the cost for a full charge 327 and a minimum charge 329. In the DC section, the cost is fixed 331, since DC charging often comes with a fixed charge as the charging is much faster.

The user is also presented with an option to select which charging type is desired 333. The charging selection will result in the display of a route associated with the particular chosen charging type.

In addition to time and cost, the display may present the user with a list of Points of Interest (POI) at the charging location to help them decide how they may spend their time while charging. POI may include restaurants, shopping, entertainment, etc. and can also be based upon user-defined POI preferences. The user may be presented with a manageable number of options optimized with different purposes, depending on a user profile and/or settings.

Figure 4:
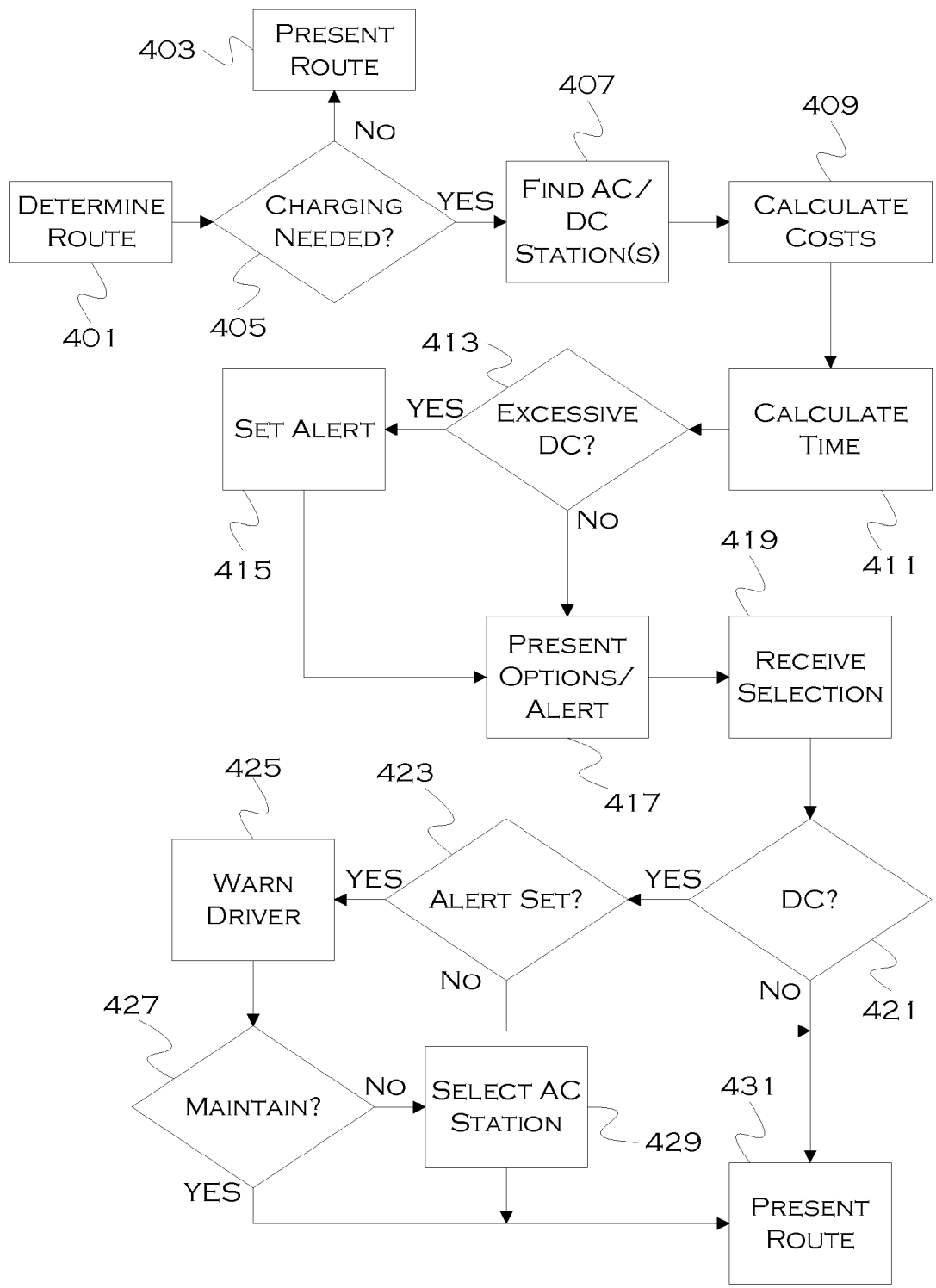
FIG. 4 shows an illustrative example of a charging station discovery process.

FIG. 4 shows an illustrative example of a charging station discovery process. This process may result in the presentation of both DC and AC charging options, or only one of the options. The process may also result in selection of an optimal route/station, in conjunction with discussed parameters for rule-based route selection as shown with respect to FIG. 5.

In this illustrative example, the process determines a route to the destination 401. This could be a standard navigation process, discovering an optimal route based on distance, time, or any other suitable parameter. Once the route has been discovered, the process determines whether or not charging will be needed to complete the route 405. This determination could be whether or not charging will be needed for a one-directional journey, or whether or not charging will be needed for a round-trip.

If charging is not needed, the process will simply present the route 403. This presentation may also include an option to see charging stations, if available. If charging stations are needed to complete the journey, the process may find AC and/or DC stations along the route 407.

Typical gas station discovery applications will usually find gas stations that are physically located along a route, or within a very short distance from the route. Since, currently, charging stations are far less prevalent, the station discovery algorithm may discover stations that are further from the route. Also, since the charging typically takes far longer than gas fill-up, the process may be less concerned with finding a station that is only 1-2 minutes from the route, as the amount of time spent traveling to the station may only represent such a small fraction of the total charging time.

In this example, the process also calculates the costs associated with each charging station 409. These costs could be based on known or available cost data for each station. Costs in battery damage may also be included in this cost equation, as well as any other long-term costs for the vehicle (additional distances traveled, etc.). Total time is also determined 411, which can include time to charge and time to/from the station (i.e., off-route time), this time may also have a cost associate with it. In one example, the user can assign a personal value to time, such that a fixed value can be associated with time for a given user.

Also, in this example, the process determines if excessive DC charging is being used 413. If the DC charging is being used overmuch, battery degeneration may be accelerated beyond normal degeneration, and the resultant costs of DC charging, incorporating this degeneration, may be unacceptably high. If DC charging is excessive, the process may set an alert to notify the user that DC charging should not be used so frequently 415. Then, any charging options (both DC and AC) and/or any alerts may be presented to the user 417.

Since DC charging is faster, and may be completely acceptable, the process may present DC options first. The process may also present both options in tandem, or skip DC charging entirely if the DC charging is being used too frequently. In this example, the process waits to see which charging option is selected from the presented options 419.

If the driver selects DC charging 421, the process checks to see if any alert was set for DC charging 423. If there is a DC charging alert (i.e., the driver is over-using DC charging), the process may notify the driver that DC charging is not recommended at this time 425. The driver can then choose whether to maintain the DC selection or switch to AC selection 427. If DC charging is maintained, or if no alert is set (meaning that DC charging is not currently flagged as "over-used"), the process may present a route 431 including the selected DC charging station. If DC charging is not selected, the AC route will be presented. If the driver opts not to maintain the DC route, and switches to an AC route 429, the process will also present a route including the AC charging.

In another example, the process may "optimize" a charging route for the driver. The optimization strategy may be based on a variety of factors. A driver may choose to optimize route selection based on DC, AC, cost, time or any other suitable value. These driver preferences may be used in conjunction with other variables to present optimized route suggestions that include recommended charging stops.

Route selection may be based on, for example, without limitation, route feasibility (e.g., is the driver heading fifteen miles in the wrong direction), route cost in time, route cost in energy, route cost in battery damage, charging session cost. Variables associated with both DC and AC charging may also be considered.

With respect to DC charging, considerations may include, but are not limited to, price of charging session, cost of battery damage, time to travel route, estimated wait times (charging stations often have wait-times associated therewith, as vehicles take longer to "fill up"), and charge time. With respect to AC charging, considerations may include, but are not limited to, amount of energy needed to complete the route (minimum recommended charge), price of charge, wait time, and charge time for minimum charge. Both AC and DC charging optimization strategies may also consider the cost of energy needed to complete the route.

Using this and any other suitable data, the process may calculate optimized routes and their respective charging times. Based on the results, one or more routes may be presented to the drivers for utilization.

When multiple options exist for routes, cost and time functions may be used for each route to determine an "optimal route." Optimal routes may vary by driver, depending on what is important to that driver. A busy, working parent may desire the shortest charge time, whereas a high-school student with lots of time, but less money, may desire the cheapest charging option. Shown below are some examples of equations that may be used to calculate cost functions and time functions.

$$Cost_{DC} = \$(\text{Charging}) + \left(\left(\frac{1}{\text{Allowed DC Fast Charge Cycles}}\right) \times \$(\text{New Battery})\right) + \$(\text{Energy\_Cost}_{Route})$$

$$Cost_{AC} = \$(AC_{Rate} \times kW \times Time_{Charge}) + \$(\text{Energy\_Cost}_{Route})$$

$$Time = Time_{Route} + Time_{Wait} + Time_{Charge}$$

Other factors may also be considered along with cost and time, including, but not limited to, weightings of costs and times based on individual user preferences ($W_1$, $W_2$, etc. . . . ). A total route score for each route could be calculated as follows, for example.

$$\text{Score}_{route} = p1(W_1 \times \text{Cost} + W_2 \times \text{Time} + W_3 \times \text{Attribute}_X \ldots) + (1-p1) \times \text{Cost}_{towing}$$

In the above example, p1 is the probability of the vehicle successfully navigating the route (e.g., it may be low if charge is low and the station is far away).

The process may also track and present DC fast charge usage, to keep a user informed, including, but not limited to, DC charging speeds, state of charge at start of DC sessions, average battery temperature during charging and battery age during charge. This profile may also show the driver how much total DC charging is estimated to remain with recommended usage, so the driver can personally decide when to use the limited recommended charging sessions.

Figure 5:
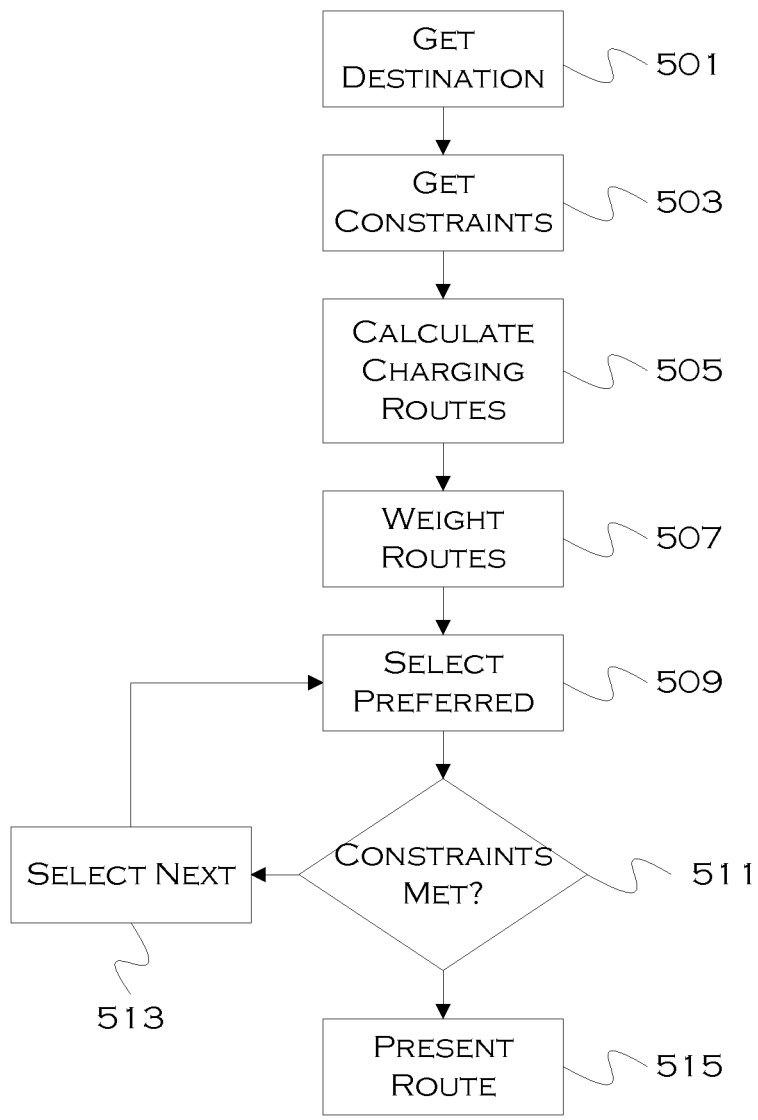
FIG. 5 shows an illustrative example of a route optimization process.

FIG. 5 shows an illustrative example of a route optimization process. In this illustrative example, the process receives the destination input from the driver 501. As before, this is used to determine the "standard" route to the destination, since it is possible that charging may not be needed. If charging is needed, based on estimated usages of remaining power, the process will get the constraints (time, cost, etc.) 503 associated with the current driver or vehicle. If no constraints have been driver-set, there may be a set of constraints pre-set by the factory or manufacturer, balancing time and potential for battery damage.

The costs of the various routes to charging stations and the destination can then be calculated 505. This will result in base costs for the routes, and can include the factors previously listed, as well as other suitable factors. The base costs will then be weighted in accordance with driver preferences 507. In the example set forth previously, the parent may value their time at $50 an hour, whereas the high-school student may value their time at $10 an hour. Using these values, the costs can be weighted based on overall time and total costs for each route may be determined.

In another example, the parent may set "always present the fastest route unless DC charging is damaging above a threshold," and the high school student may set "always present the cheapest route unless DC charging is not currently damaging" and the results may be weighted accordingly. In this example, the parent would receive DC charging options until the possibility of damage reached a threshold, and the high-school student would receive AC charging options once the recommended number of DC charging stops for the battery's current point in its lifecycle had been used, or, for example, if a maximum number of recommended DC charging stops for a day/week/month/etc. had been used.

The process will then select a preferred route based on the weighting of the routes 509 and ensure that any driver constraints have been met 511 (e.g., the vehicle may have a "never use DC if the damage is above a certain threshold" constraint set). If the constraints have not been met, the process will select a next best route 513 and repeat, until a route meeting all constraints has been discovered. This route will then be presented to the driver 515.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
discover charging station locations within a predefined proximity to a route for which vehicle-charging is required to complete;
determine a charging cost at each discovered station, including at least battery-damage cost resulting from a charge;
present a plurality of charging stations, including the charging costs and an estimated total route time for each station;
and
present a route including a stop at a station selected by a user.

2. The system of claim 1, wherein the processor is configured to expand the predefined proximity until at least two charging stations have been discovered.

3. The system of claim 1, wherein the cost includes a stochastic charging cost.

4. The system of claim 1, wherein the cost includes a stochastic time cost.

5. The system of claim 4, wherein the time cost includes a stochastic travel time cost.

6. The system of claim 4, wherein the time cost includes a stochastic wait-time cost.

7. The system of claim 4, wherein the time cost includes a stochastic charging-time cost.

8. The system of claim 1, wherein the processor is further configured to:
weight the charging costs and total route time based on user-defined preferences;
determine a total score for each station based on the weighted charging costs and total route time; and
present a station having a lowest total score.

9. The system of claim 8, wherein the user-defined preferences include a cost-value assigned to time.

10. A computer-implemented method comprising:
discovering charging station locations within a predefined proximity to a route for which vehicle-charging is required to complete;
determining, via a vehicle-associated computer, a charging cost at each discovered station, including at least battery-damage cost resulting from a charge;
presenting a plurality of charging stations, including the charging costs and an estimated total route time for each station;
and
presenting a route including a stop at a station selected by a user.

11. The method of claim 10, further comprising expanding the predefined proximity until at least two charging stations have been discovered.

12. The method of claim 10, wherein the cost includes a charging cost.

13. The method of claim 10, wherein the cost includes a time cost.

14. The method of claim 13, wherein the time cost includes a travel time cost.

15. The method of claim 13, wherein the time cost includes a wait-time cost.

16. The method of claim 13, wherein the time cost includes a charging-time cost.

17. The method of claim 10, further comprising:
  weighting the charging costs and total route time based on user-defined preferences;
  determining a total score for each station based on the weighted charging costs and total route time; and
  presenting a station having a lowest total score.

18. The method of claim 17, wherein the user-defined preferences include a cost-value assigned to time.

19. A non-transitory computer-readable storage medium, storing instructions that, when executed by a processor, cause the processor to perform a method comprising:
  discovering charging station locations within a predefined proximity to a route for which vehicle-charging is required to complete;
  determining a charging cost at each discovered station, including at least battery-damage cost resulting from a charge;
  presenting a plurality of charging stations, including the charging costs and an estimated total route time for each station;
  and
  presenting a route including a stop at a station selected by a user.

20. The computer-readable storage medium of claim 19, wherein the method further comprises:
  weighting the charging costs and total route time based on user-defined preferences;
  determining a total score for each station based on the weighted charging costs and total route time; and
  presenting a station having a lowest total score.

* * * * *